United States Patent
Hachmann et al.

(10) Patent No.: US 7,415,388 B2
(45) Date of Patent: Aug. 19, 2008

(54) METHOD FOR THE AUTOMATICALLY DETERMINING THE INDIRECT AND DIRECT EXTENT OF DAMAGES RESULTING FROM A FAILURE OF TECHNICAL COMPONENTS IN OBJECTS INTEGRATED IN A PRODUCTION CYCLE

(75) Inventors: Frank Hachmann, Orsberger Strasse (DE); Christian Sachgau, Waldstrasse (DE); Dietmar Peschel, Ebereschenstrasse (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/557,462

(22) PCT Filed: May 19, 2004

(86) PCT No.: PCT/EP2004/005414

§ 371 (c)(1),
(2), (4) Date: Oct. 23, 2006

(87) PCT Pub. No.: WO2004/104837

PCT Pub. Date: Dec. 2, 2004

(65) Prior Publication Data

US 2007/0094547 A1 Apr. 26, 2007

(30) Foreign Application Priority Data

May 20, 2003 (DE) ................................ 103 23 040

(51) Int. Cl.
*G06F 15/00* (2006.01)
*G06F 9/44* (2006.01)

(52) U.S. Cl. ................................ 702/185; 705/7; 705/8
(58) Field of Classification Search .................. 702/185
See application file for complete search history.

(56) References Cited

U.S. PATENT DOCUMENTS

| 5,132,920 A | * | 7/1992 | Bellows et al. ............... 702/184 |
| 6,032,123 A | * | 2/2000 | Jameson ......................... 705/8 |
| 6,968,293 B2 | * | 11/2005 | Wiegand ..................... 702/184 |
| 7,203,622 B2 | * | 4/2007 | Pan et al. ..................... 702/184 |

FOREIGN PATENT DOCUMENTS

WO 02/44832 A2 6/2002

OTHER PUBLICATIONS

S.H. Schwartz, D. Zeger, Value Oriented Network Management, Avesta Technologies, Inc., p. 715-728. 2000.
Bundesamt für Sicherheit in der Informationstechnik, IT-Grundschutzhandbuch, Kap. 2.2., Oct. 2000, p. 43-58.

* cited by examiner

*Primary Examiner*—Bryan Bui
*Assistant Examiner*—Jonathan Moffat
(74) *Attorney, Agent, or Firm*—Christa Hildebrand; Norris McLaughlin & Marcus, PA

(57) ABSTRACT

A method is provided for the automated determination of the indirect and direct extent of damages in objects resulting from a failure of technical components integrated in a production cycle. The invention involves the detection of the components that are affected by a failure, a determination of the number of clients and/or users dependant on each affected component, and a determination of the point in time of the expected renewed availability of each affected component. The extent of the resulting indirect and indirect monetary damages is determined on the basis of this information.

15 Claims, 2 Drawing Sheets

METHOD FOR THE AUTOMATICALLY DETERMINING THE INDIRECT AND DIRECT EXTENT OF DAMAGES RESULTING FROM A FAILURE OF TECHNICAL COMPONENTS IN OBJECTS INTEGRATED IN A PRODUCTION CYCLE

BACKGROUND OF THE INVENTION

The invention is directed to a method for automatically determining the direct and direct extent of damages resulting from a failure of technical components in objects integrated in a production cycle, such as components of a computer network or telecommunication network, in objects, by taking into account network structure, emergency planning, startup planning, as well as client and user behavior.

Guaranteeing the availability of technical components, for example in IT networks, telecommunication networks, etc., is essential for maintaining excellent client relations. The total failure of an object, for example a room or an entire building, with all the industrial components housed in that room or building, can ruin a company within a short time.

To alleviate this situation, many companies have instituted measures, for example a redundant network structure, emergency and startup planning, to minimize or neutralize any negative effects for the clients following a total failure of technical components.

These measures should prevent or minimize the extent of expected damages. The expenditures associated with these measures should be cost-effective and should have an acceptable economic correlation with the extent of the expected damages.

The investments and the costs for a measure can be determined quite accurately, whereas a large number of parameters and complex interdependencies have to be considered for determining of the extent of the expected damage.

To date, only the replacement value of the component(s) and the consequential damage due to the unavailability of the components was directly considered when the damage resulting from the failure of one or more several technical components was computed. It was assumed that the component would not be available for a certain period of time, and the component would again be 100% available after that time. However, emergency planning, so-called workarounds, have the effect that the failed components do not become available again at the same time, but are rather returned to service sequentially, so that the affected users will suffer the consequences of such failure for different lengths of time, which was not overlooked.

SUMMARY OF THE INVENTION

It is an object of the invention to provide a method that enables essentially the automatic determination of the extent of direct and indirect damages following a total failure of technical components integrated in a production cycle, taking into consideration those measures that could reduce damages, such as network structure, emergency planning, startup planning, as well as client and user behavior.

The object is solved by the invention by providing a for automatically determining the indirect and direct extent of damages resulting from a failure of technical components in objects integrated in a production cycle. The method includes a) identifying the technical components affected by a failure, b) determining the number of clients and/or users depending on each affected component, c) determining the time when each affected component will become available again, and d) determining the extent of the resulting indirect and direct monetary damages based on the results from steps a) through c).

The method automatically determines the extent of the direct and indirect monetary damages, for example, in a particular currency such as Euro (€) currency, for an object, a room or a building.

The interdependencies of the affected technical components are evaluated. The required parameters and values are available in corresponding databases. A data processing system executing the method can perform automated and controlled database queries.

According to the invention, only certain phases or partial segments of a production cycle and the integrated technical components may be selectively evaluated, meaning that the extent of the damage is determined only for parts of a production cycle.

Advantageous embodiments and modifications of the method of the invention are recited in the dependent claims.

An embodiment of the invention will now be described in more detail with reference to the drawings. Additional features, advantages and applications of the invention will be suggested. More particularly, the exemplary embodiment is directed to technical components of a communication network, which will also be referred to hereinafter as network components. It should be noted that the method of the invention is not limited to components of a communication network, but can be applied to any type of technical components that are integrated in a production cycle.

DETAILED DESCRIPTION OF THE DRAWINGS

Identifying the Affected Network Components

Figure 1:
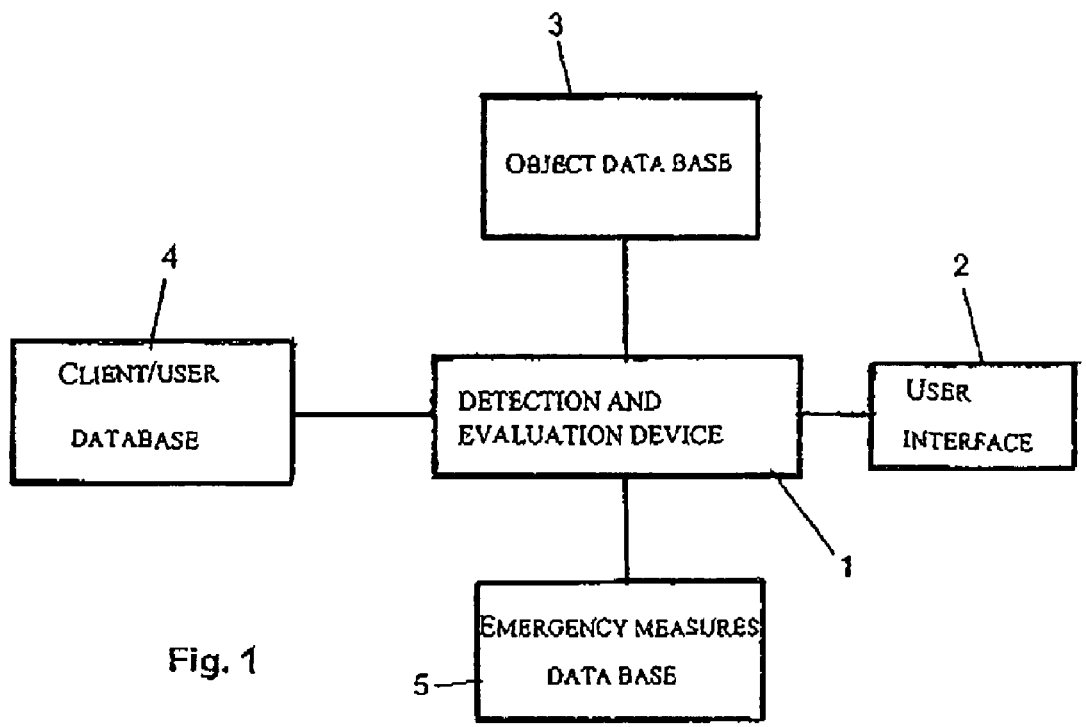
FIG. 1 shows the essential components for performing the method.

Execution of the method is based on a data acquisition and evaluation unit 1.

The object is selected by the user via a user interface 2. By selecting a defined object, an object database 3 is automatically queried to identify the affected network components of the object. In particular, the following information is available in the object database 3 the type of the network component the number of the network components

Identifying the Currently Administered Clients/Users

For identifying the currently administered clients/users, the data acquisition and evaluation unit 1 additionally automatically queries a client database 4. Based on the network component affected by a failure, the respective number of the administered clients/users for each network component is transmitted to the data acquisition and evaluation unit 1.

According to the method, the number of clients/users is associated with the information concerning the type and number of network components.

Identifying the Affected Clients/Users Based on the Network Structure

Various network components take part in providing a service or a product to the client/user. The network components have a defined relationship to each other when providing services and/or products.

Only those clients for each network component are included in the following calculation, which will have all services restored when the respective network component is again online.

Clients who do not have their full service restored because other network components are unavailable must not be included when computing the network component. Those clients are included in the calculation only after the network components that provide all services to the clients are restored.

The data acquisition and evaluation unit 1 automatically computes the portion of the clients that must be subtracted from the corresponding network components based on the total number of the network components in the network,
the number of failed network components, and
the time when the network components become again available.

Emergency and Startup Planning

The order in which the failed network components are expected to be restored, i.e., available again, is determined by the chronologic order of the emergency/startup measure.

For example, the investments, costs and operating modes of the respective emergency measure and startup measure are maintained in an emergency database 5.

Timing and Effect of the Emergency Measure

The emergency measure is implemented in several chronologic phases.

startup phase emergency planning,
"step-wise activation" of the emergency measure,
residual impairment of the client in spite of the emergency measure.

Each phase of the emergency measure provides information about the number of the affected clients as a function of the duration of the phases. The number of the affected clients/users decreases with progressing activation of the emergency measure, until the emergency measure is fully implemented.

In spite of the activation of the emergency measure, there may still be reduced availability and therefore residual damage until the startup measure is activated or normal operation is resumed.

According to the method, the following quantities are computed from the number of clients administered in the network components and the chronology of the emergency and startup measures:

the number of the affected clients, and
the duration of the impairment of the client.

Timing and Effect of the Startup Planning

The startup planning enables the transition from emergency operation (end of the emergency measure) to resumption of normal operation.

Each phase of the startup measure provides information about the corresponding number of clients/users affected in the network component as a function of the duration of the phase. The residual number of affected clients/users is reduced to zero while the activation of the startup measure progresses, until normal operation is resumed.

Figure 2:
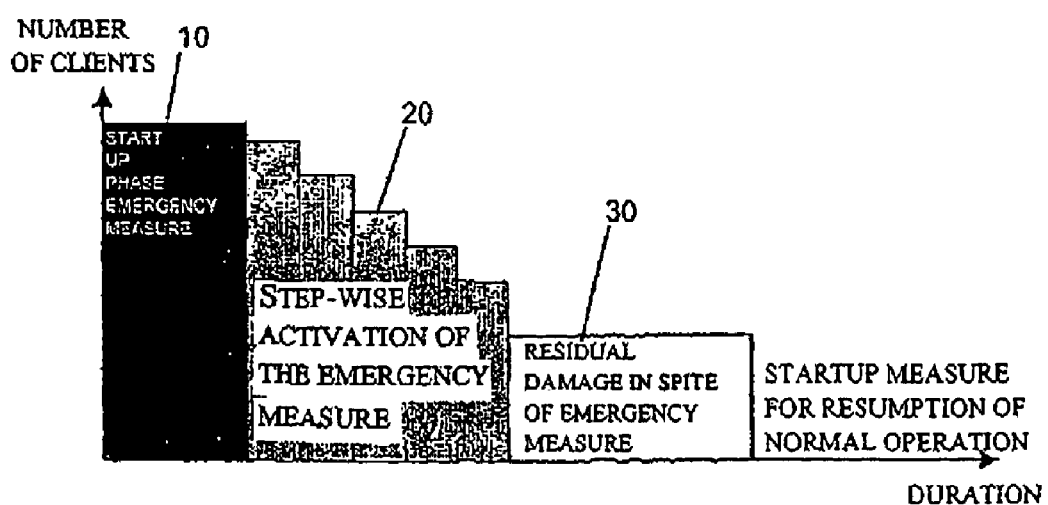
FIG. 2 is a schematic diagram of the phases of an emergency and startup measure.

FIG. 2 shows a schematic diagram of the phases of an emergency and startup measure.

Course of the Activation of an Emergency Measure:

In the startup phase of the emergency measure, FIG. 2, block 10, the extent of the damage is determined and a suitable emergency measure is selected.

short duration
large impairment of the client

In the phase "stepwise activation" of the emergency measure, FIG. 2, block 20, the impairment of the client is successively reduced.

average duration
large to small impairment of the client (in steps)

When implementation of the emergency measure is complete, the impairment of the client is reduced to the greatest extent, with potentially residual damage, FIG. 2, block 30 long duration
small impairment of the client (residual damage)

Finally, the startup planning is completely implemented and normal operation resumes no impairment of the client Determination of the Affected Clients Based on the Duration (Phases)

Based on the automated database queries, the acquisition and evaluation unit 1 automatically computes the number of those affected clients that are without service or products for a certain period of time.

Figure 3A:
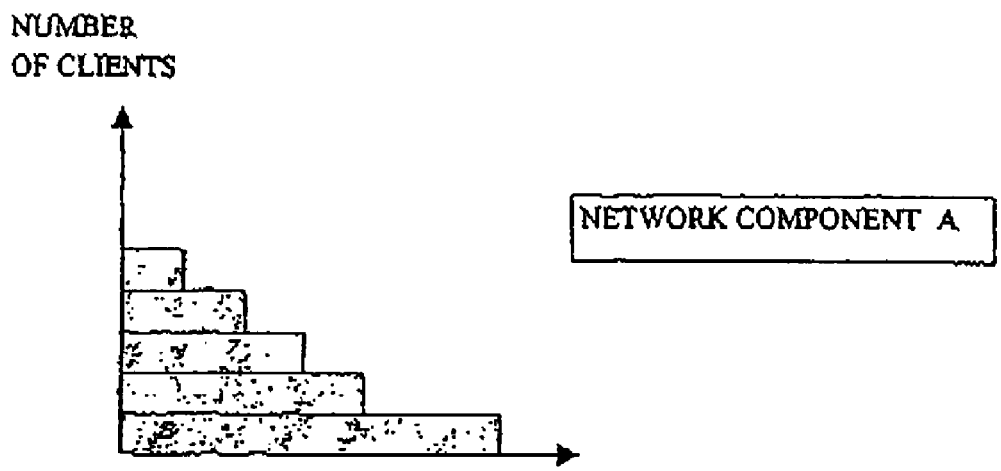
FIGS. 3a, b, c shows schematically a determination of the number of clients that are without product/service for a certain time period when two network components A and B fail.
Figure 3B:
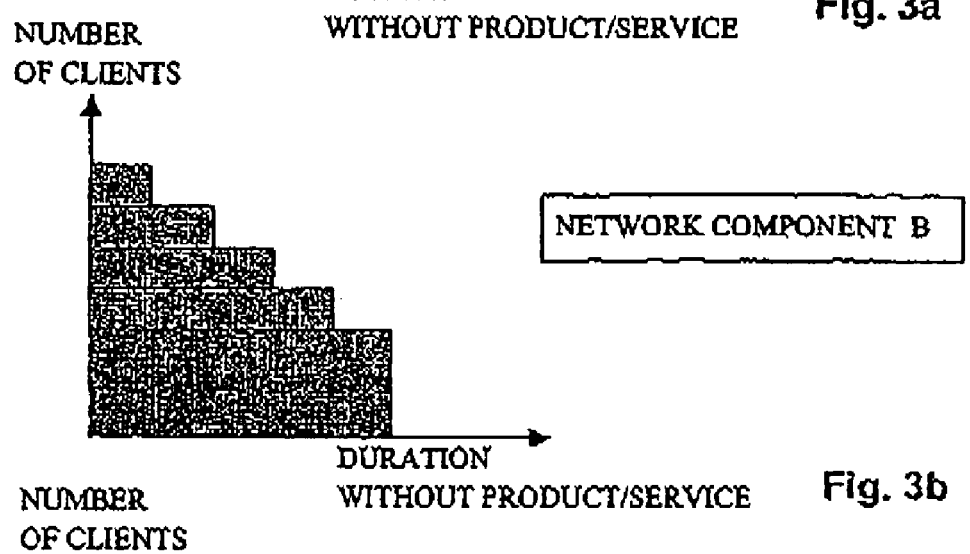
Figure 3C:
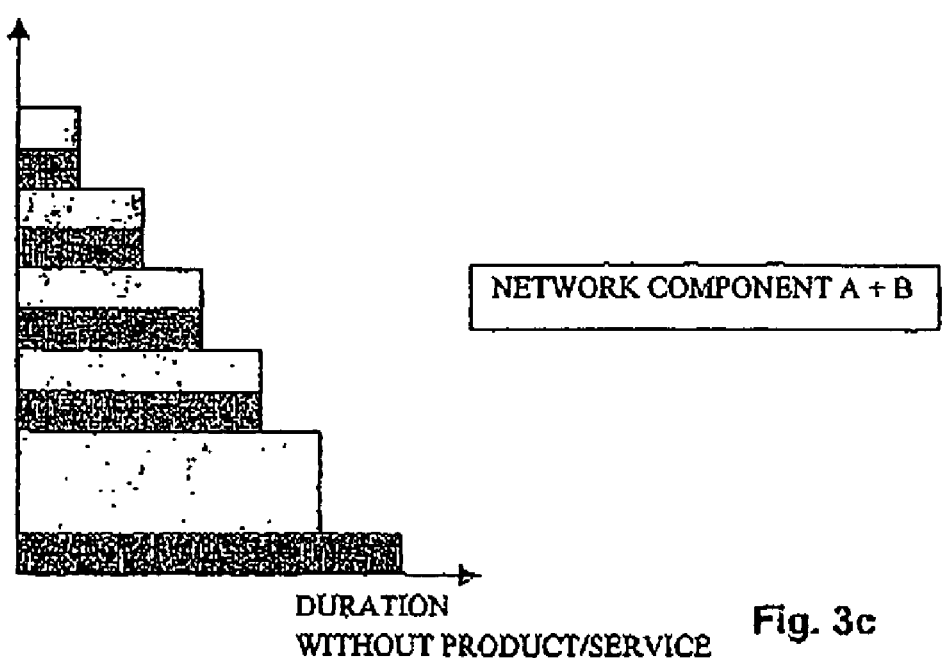

This is illustrated in FIGS. 3a, 3b, and 3c.

The number of affected clients, which were without service/product for a certain period of time, is determined for each network component A and B (FIGS. 3a and 3b). The results are summarized and provide a complete picture of the extent of the damage (FIG. 3c).

Determination of the Extent of the Damage

The extent of the damage in monetary terms can be divided into direct damage
indirect damage Determination of the Direct Damage The direct damage is maintained for each network component in databases, for example, an object database 3, a client database 4, and is essentially composed of investments and costs for the acquisition of new network components and startup of the network components
revenue loss due to the "unavailability" of the services/products
investments/costs for the emergency measure(s)

The information is kept current in the databases 3, 4, with the acquisition and evaluation unit 1 automatically querying the parameters and values in the databases.

Determination of the Indirect Damage

The indirect damage is essentially independent of the failed network components. The parameters and values for determining the indirect damage are maintained in the databases 3, 4, 5. The essential components are:

new clients cannot be activated as a result of the failure
dissatisfied existing clients cancel their contracts or do not extend their contracts
massive inquiries in the call centers create additional costs
costs are associated with signing up new clients (credits, incentives)

The current information is maintained in the databases 3, 4, 5. The method automatically queries the parameters and values in the databases.

In addition, in particular for complete failures of network components of longer duration, the indirect extent of the damages must be taken into consideration. These are determined from client/user behavior, whereby the following essential features should be mentioned:

fewer new clients sign up
increasing number of cancellations

Computation of the Monetary Damages

The method is used to automatically compute, based on the queries, the current extent of monetary damages in the event of a total failure of all network components in an object (room/building), based on the computed number of the affected clients/users, and the parameters and values of the extent of the indirect/direct damage The extent of the monetary damage is represented, for example, in the currency unit Euro (€).

Planning Support

The method can be used to gain important information about new objects, rooms and buildings already in the planning phase, so that the company will be able to absorb the expected monetary damages.

This can be achieved by including individual network components in the computation or removing individual network components from the computation.

The extent of the residual damage can be automatically computed with this method in the aforedescribed manner.

If a planner decides to install an additional network component or to move a network component to another room/another building, then the planning database is automatically adjusted through an input command in the application program for the process. The physical design is thus automatically implemented.

Installing new network components or moving network components to new/different industrial rooms/buildings is a highly effective safety measure, which can be employed for planning purposes and effectively reduce the expected maximum extent of the damage. The resulting damage can thereby be less or at most equal to the predefined maximum extent of the expected damage.

The method of the invention makes it possible to automatically simulate new installations of network components and move network components to other industrial rooms/buildings, and compute the maximum extent of the expected damage and the resulting number of affected clients. In this way, the industrial room/building can be optimally utilized according to plan, while taking into consideration the predefined maximum extent of the damage.

If the predefined maximum extent of the damage is exceeded, the method suggests in an additional optimization step those network components which, when moved, make it possible to optimally stay below the predefined maximum extent of the damage. In addition, the optimization step suggests the room(s) or building(s) where the selected network components "to be moved" could be installed.

The method can also produce a ranking based on a cost/benefit analysis by storing the costs associated with safety measures and/or with moving network components, which can then form a basis for making decisions.

The method can be used in an application "Evaluation of the Economic Aspects" to optimize investments and costs by defining safety measures for existing industrial rooms/buildings.

The described method can also be used to forecast the expected maximum extent of the damage when equipping new industrial rooms/buildings and/or when moving network components into existing or new industrial rooms/buildings.

The invention claimed is:

1. A method for automatically determining indirect and direct monetary damages resulting from a failure of technical components in objects integrated in a production cycle, the method comprising the steps of:

a) identifying the technical components affected by the failure, b) determining the number of clients and/or users depending on each of the affected technical components, c) determining a time when each of the affected technical components will become available again, and d) determining the extent of the indirect and direct monetary damages based on the results from steps a) through c)

wherein the indirect monetary damages includes at least one of: (i) new clients that cannot be activated as a result of the failure; (ii) dissatisfied existing clients canceling their contracts or failing to extend their contracts; (iii) additional costs associated with inquiries associated with the failure; and (iv) costs associated with signing up new clients.

2. The method according to claim 1, wherein the determining step d) comprises determining the extent of indirect and direct monetary damages for a selected particular phase of the production cycle.

3. The method according to claim 1, wherein the interdependencies of the affected technical components are measured and evaluated based on parameters and values residing in databases.

4. The method according to claim 1, wherein the step a) of identifying the technical components affected by the failure comprises the steps of selecting by the user a defined object, an object database is automatically queried based on the selected object for determining the affected technical components of the object.

5. The method according to claim 4, wherein the step b) of determining the number of clients and/or users depending on each of the affected technical components comprises querying a client database for determining the currently administered clients and/or users, a respective number of administered clients and/or users for each component is determined based on the affected technical components.

6. The method according to claim 5, wherein the number of the affected clients and/or users is associated with information regarding type and number of the technical components.

7. The method according to claim 6, wherein an order in which the failed components become available again is defined by a chronology of an existing emergency/startup measure, wherein investments, costs and operating modes of the respective emergency measure and startup measure are maintained in an emergency database.

8. The method according to claim 7, wherein the number of affected clients and duration of impairment is computed from the number of clients administered in the components and the chronology of the emergency and startup measures.

9. The method according to claim 8, wherein the direct damage to each individual component resulting from the failure of components is available in a database.

10. The method according to claim 9, wherein the indirect damage resulting from the failure of components is available in a database.

11. The method according to claim 10, wherein the extent of the monetary damage for a total failure of all components in an object is computed from the queries based on the determined number of the affected clients and/or users and the parameters and values for the extent of the indirect/direct damage.

12. The method according to claim 11, wherein new installations of components and/or movement of components among rooms/buildings are automatically simulated, and wherein the simulations are used to compute a maximum extent of the expected damage and the resulting number of affected clients.

13. The method according to claim 12, wherein when the extent of the damage exceeds a predefined maximum, those components are identified which can be moved to other technical rooms/buildings so as to stay below the defined maximum extent of the expected damage.

14. The method according to claim 13, wherein a room or rooms, or a building or buildings are suggested where the selected component to be moved can be installed.

15. Method for automatically determining indirect and direct monetary damages resulting from a failure of technical components in objects integrated in a production cycle, with a data input and processing device for carrying out the method, wherein interdependencies of the affected components are automatically measured and evaluated based on parameters and values residing in databases, comprising the steps:
   a) identifying the technical components affected by the failure by querying an object database,
   b) determining the number of clients and/or users depending on each affected component by querying a client database,
   c) determining a time when each of the affected technical components will become available again by querying an emergency database,
   d) determining the extent of the indirect and direct monetary damages based on the results from steps a) through c),
   wherein new installations of components and/or movement of components to other technical rooms/buildings are automatically simulated, and wherein this data is used to compute a maximum extent of expected damage and resulting number of affected clients,
   and wherein the indirect monetary damages includes at least one of: (i) new clients that cannot be activated as a result of the failure; (ii) dissatisfied existing clients canceling their contracts or failing to extend their contracts; (iii) additional costs associated with inquiries associated with the failure; and (iv) costs associated with signing up new clients.

* * * * *